US007968823B2

(12) United States Patent
Gerhardinger

(10) Patent No.: US 7,968,823 B2
(45) Date of Patent: Jun. 28, 2011

(54) WIRELESS INDUCTIVE COUPLING ASSEMBLY FOR A HEATED GLASS PANEL

(75) Inventor: Peter F. Gerhardinger, Maumee, OH (US)

(73) Assignee: Engineered Glass Products, LLC, Chicago, IL (US)

( * ) Notice: Subject to any disclaimer, the term of this patent is extended or adjusted under 35 U.S.C. 154(b) by 1421 days.

(21) Appl. No.: 11/448,482

(22) Filed: Jun. 7, 2006

(65) Prior Publication Data

US 2007/0285819 A1 Dec. 13, 2007

(51) Int. Cl.
*H05B 1/00* (2006.01)
*G11B 5/09* (2006.01)

(52) U.S. Cl. ........ 219/213; 219/214; 219/219; 219/218; 219/522; 219/645; 360/48; 360/49; 360/50; 336/118; 62/248

(58) Field of Classification Search .................. 219/213, 219/214, 219, 218, 522, 645; 360/48–50; 336/118; 62/248
See application file for complete search history.

(56) References Cited

U.S. PATENT DOCUMENTS

| | | | | |
|---|---|---|---|---|
| 3,263,063 | A * | 7/1966 | Marriott et al. | 219/522 |
| 4,248,015 | A | 2/1981 | Stromquist et al. | |
| 5,331,784 | A | 7/1994 | Agrawal et al. | |
| 5,529,708 | A | 6/1996 | Palmgren et al. | |
| 5,821,507 | A | 10/1998 | Sasaki et al. | |
| 5,852,284 | A | 12/1998 | Teder et al. | |
| 5,966,874 | A | 10/1999 | Repp et al. | |
| 6,010,602 | A | 1/2000 | Arbab et al. | |
| 6,067,482 | A | 5/2000 | Shapiro | |
| 6,086,138 | A | 7/2000 | Xu et al. | |
| 6,320,159 | B1 | 11/2001 | Topp | |
| 6,685,051 | B2 | 2/2004 | Zangari et al. | |
| 6,722,142 | B1 | 4/2004 | Pagel | |
| 6,871,450 | B2 | 3/2005 | Repp et al. | |
| 7,003,920 | B1 | 2/2006 | Messere et al. | |
| 2005/0224491 | A1 | 10/2005 | Vilato et al. | |

FOREIGN PATENT DOCUMENTS

| | | |
|---|---|---|
| FR | 2 231 177 | 12/1974 |
| GB | 2 300 934 | 11/1996 |

OTHER PUBLICATIONS

International Search Report dated Jan. 29, 2008.
"Radio Frequency" from Wikipedia, the free encyclopedia, May 1, 2006, pp. 1-5.

* cited by examiner

*Primary Examiner* — Shawntina Fuqua
(74) *Attorney, Agent, or Firm* — Nixon & Vanderhye P.C.

(57) ABSTRACT

A wireless inductive coupling assembly for a heated glass panel assembly is provided that includes a metal oxide coated glass panel with a panel frame, an opening frame that cooperates with the coated glass panel frame to allow the panel to cover a panel opening, a receiving coil that is positioned in the panel frame and that is wired to the panel, and a sending coil that is positioned in the opening frame and that is wired to an electrical power source. When the electrical power source supplies electrical power to the sending coil, the sending coil wirelessly induces an electrical current in the receiving coil, which causes the dielectric panel to provide heat.

24 Claims, 2 Drawing Sheets

WIRELESS INDUCTIVE COUPLING ASSEMBLY FOR A HEATED GLASS PANEL

FIELD OF THE INVENTION

The present invention relates to electrical connectivity for a heated dielectric unit. More particularly, the present invention relates to electrical connectivity for a heated glass panel by way of a wireless electrical inductive coupling assembly.

BACKGROUND OF THE INVENTION

Those skilled in the art know that electrical power is utilized to produce heat in dielectric panels (a.k.a., units), for example, glass, ceramic, or glass-ceramic panels, that have an electrically conductive thin-film coating, which typically is non-magnetic, disposed thereon. In the past, film deposition techniques, such as those used in spray coatings, were not precise, which resulted in non-uniform coatings and consequently imprecise heating. Recently, the deposition of, for example, metal oxide coatings has improved through the use of chemical vapor deposition (CVD) processes.

Examples of heated glass applications that have utilized these coatings over the last thirty years are commercial refrigerator and freezer doors in supermarkets, where a tin oxide coating is disposed on one of the interior surfaces of an insulating glass (IG) panel and where an electric current is dissipated in the tin oxide coating to provide heat to raise the glass temperature above the dew point. On such doors, the heat eliminates the formation of condensation so that employees and customers can view the refrigerator/freezer contents after individuals have opened and closed the doors.

Non-uniform coatings and traditional electrical control connection methods, however, result in wasted energy, produce hot and cold spots on the glass, and can result in safety hazards should the glass break and expose the current-carrying film. In order to provide the electrical power to such heated dielectric panels, electrical wires are, typically, directly connected to bus bars that are disposed on the heated dielectric panels or electrical wires are directly connected to metal tabs that are disposed on these bus bars.

Often, electrical wires from, for example, an electrical power source, are routed by pathways, for example, conduit, raceways, and/or door/window sashes and jambs, to the heated dielectric panels. Potentially, direct wiring to the bus bars or the metal tabs can be unyielding and unsafe.

As they apply to building applications (i.e., windows, doors, skylights, and radiant heater panels) in the U.S., the methodologies associated with electrical wiring are established by the National Electrical Code (NEC). Per the NEC, any wiring having voltages greater than 42 volts is designated as class I wiring, which must be protected from accidental damage and must have all interconnections, splices, etc. inside an approved junction box (j-box). Hence, it is not possible to directly run wiring, for purposes of carrying line voltage and usable power, to operable windows and doors, and still comply with NEC requirements.

In addition, most code officials and inspectors require that any installed electrical device must have Underwriter Laboratory (UL) or equivalent approval. UL also will not approve exposed wiring or exposed connectors at 110-250 volts.

One means of interconnecting wiring, which has been used in the past, is to utilize pin connectors with a safety interlock, but there are concerns regarding the long term reliability of such connectors, since corrosion of the connectors can result in electrical arcing at the connectors. Also, if the safety interlock is bypassed or defeated, electrical shock potential can result.

Regarding connectivity to heated glass panels, U.S. Pat. No. 5,852,284 to Teder et al. utilizes a capacitor to electrically couple to a heated glass door/panel, where the coupling is achieved by "adjusting" power from an electric power source by way of the capacitive reactance of an RC (resistor/capacitor) circuit. Then, Teder directly connects the capacitor, whose geometry must be considered when being mounted in the frame/sash of a door/window or in the space between two panes of glass, to the heated glass door/panel. In addition, the value (in farads or portions thereof), plate size, spacing, and dielectric material of the capacitor must be specifically chosen for the glass size and power level.

On the other hand, U.S. Pat. No. 5,529,708 to Palmgren et al. teaches the use of electrical radio frequency energy in the range of 2.5-8 MHz, where a non-magnetic substrate has a magnetic coating disposed thereon, to provide an inductive heater. However, Palmgren is silent on the utilization of non-magnetic coatings that are typically found in heated glass applications and which are discussed herein. Hence, neither Teder nor Palmgren overcome the above stated shortcomings associated with directly connecting a power source to a heated glass panel.

U.S. Pat. No. 5,821,507 to Sasaki et al. provides an electric cooker that utilizes a work coil to generate an inductive flux that heats a metal heating member. An insulator separates the work coil from the metal heating member and a wire mesh is used to support a food item. As illustrated in Sasaki's FIGS. 11 and 13, alternatively, a pot or pan may be used to support the food item, where electrical power is transmitted from a first work coil to an induction coil, which in turn supplies electrical power to a second work coil. The second work coil directly generates eddy currents in the bottom portion of the metal pan, thus heating the food item by way of eddy current loss.

Still, it would be advantageous to seek an indirect electrical connectivity means to wirelessly communicate electrical energy to a heated glass panel assembly that is electrically safe, energy efficient, and meets or exceeds NEC and UL standards.

SUMMARY OF THE INVENTION

The present invention relates to a wireless inductive coupling assembly for a heated dielectric panel assembly. The wireless inductive assembly comprises a dielectric panel that has a metal oxide coating disposed thereon and a panel frame disposed on at least a portion of a periphery thereof. The wireless inductive coupling assembly further comprises an opening frame, where the opening frame cooperates with the panel frame to allow the dielectric panel to at least partially cover a panel opening.

Still further, the wireless inductive coupling assembly comprises a receiving coil and a sending coil. The receiving coil is disposed in the panel frame, while the receiving coil is in electrical communication with the dielectric panel. On the other hand, the sending coil is disposed in the opening frame, where the sending coil is in wireless inductive electrical communication with the receiving coil, and where the sending coil is in electrical communication with an electrical power source. Thus, when electrical power from the electrical power source is communicated to the sending coil, an electrical current is induced in the receiving coil, which in turn causes the panel to generate heat.

Further advantages of the present invention will be apparent from the following description and appended claims, reference being made to the accompanying drawings forming a part of a specification, wherein like reference characters designate corresponding parts of several views.

DETAILED DESCRIPTION OF THE INVENTION

Figure 1:
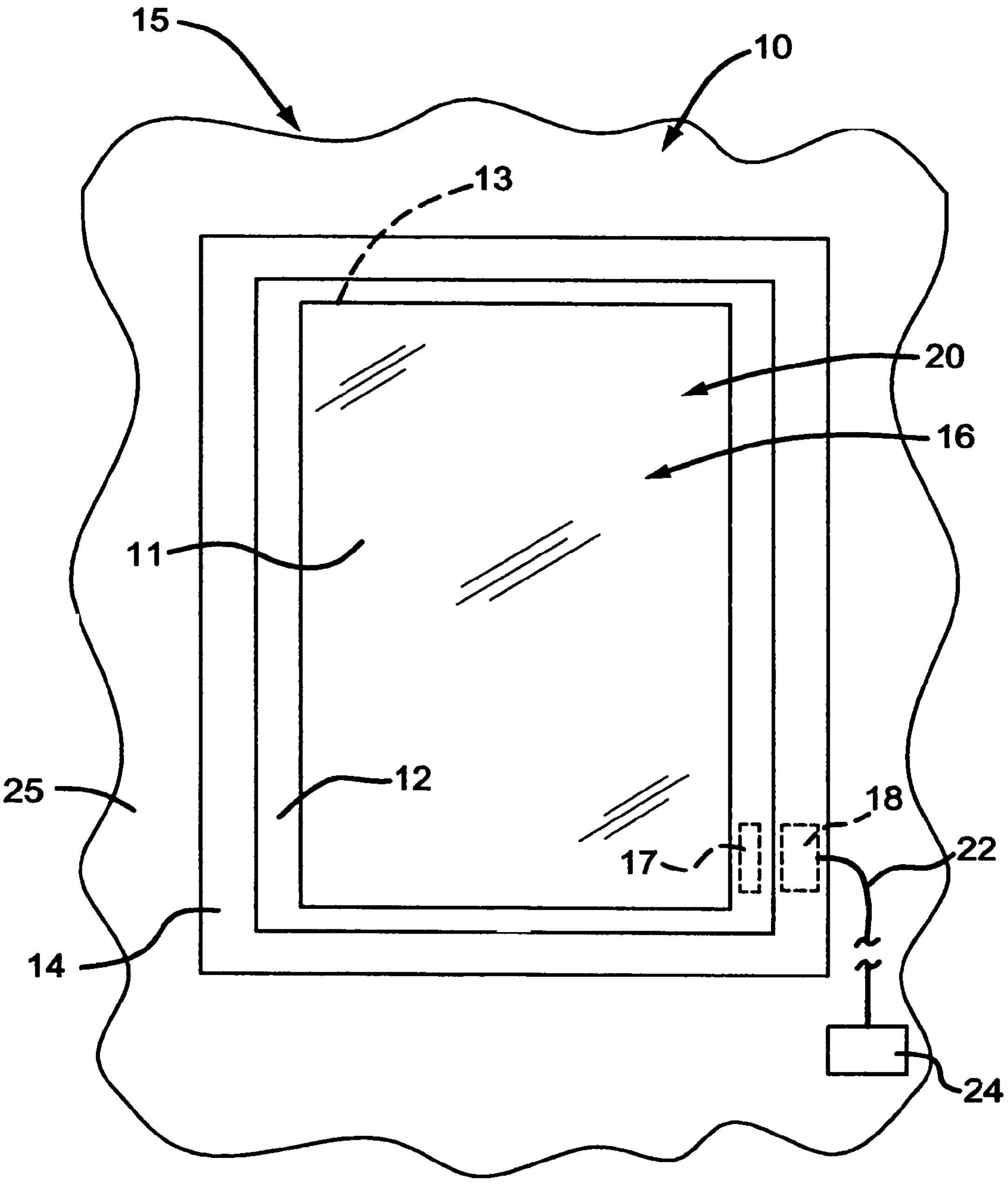
FIG. 1 is an elevation view of a wireless inductive coupling assembly in accordance with the present invention.

The present invention, as illustrated in FIG. 1, relates to a wireless inductive coupling assembly 10 that comprises a heated dielectric panel 15. The heated dielectric panel assembly 15 comprises a dielectric panel 20 (a.k.a, a dielectric sheet), where the dielectric panel 20 has at least two bus bars 26 (see FIG. 2) disposed on a metal oxide coating 11 that in turn is disposed on a dielectric substrate 20*a*. The heated dielectric panel assembly 15 also has a panel frame 12 disposed on at least a portion of a periphery 13 thereof. The wireless inductive coupling assembly 10 further comprises an opening frame 14, where the opening frame 14 cooperates with the panel frame 12 to allow the heated dielectric panel assembly 15 to cover a panel opening 16.

Still further, the wireless inductive coupling assembly 10 comprises a receiving coil 17 and a sending coil 18. The receiving coil 17 is disposed in the panel frame 12, where the receiving coil 17 is in electrical communication with the metal oxide coating 11 on the dielectric panel 20, via the bus bars 26. On the other hand, the sending coil 18 is disposed in the opening frame 14, where the sending coil 18 is in wireless inductive electrical communication with the receiving coil 17, and where the sending coil 18 is further in electrical communication 22 (that includes wires, conduit, and the like) with an electrical power source 24.

In order to control and to supply power to the coils 17,18 and the dielectric panel 20, the electrical power source 24 may comprise a solid-state controller (as used herein, the solid-state controller is an electronic device that comprises a microprocessor), a power supply, sensors, a triac circuit, and input/output circuitry as that contained in U.S. Application Publication No. 2003/0127452 to Gerhardinger et al., which is incorporated herein by reference in its entirety. See, for example, FIGS. 1A, 8A (insulating glass), 9 (laminate) of the '452 Publication.

Figure 2:
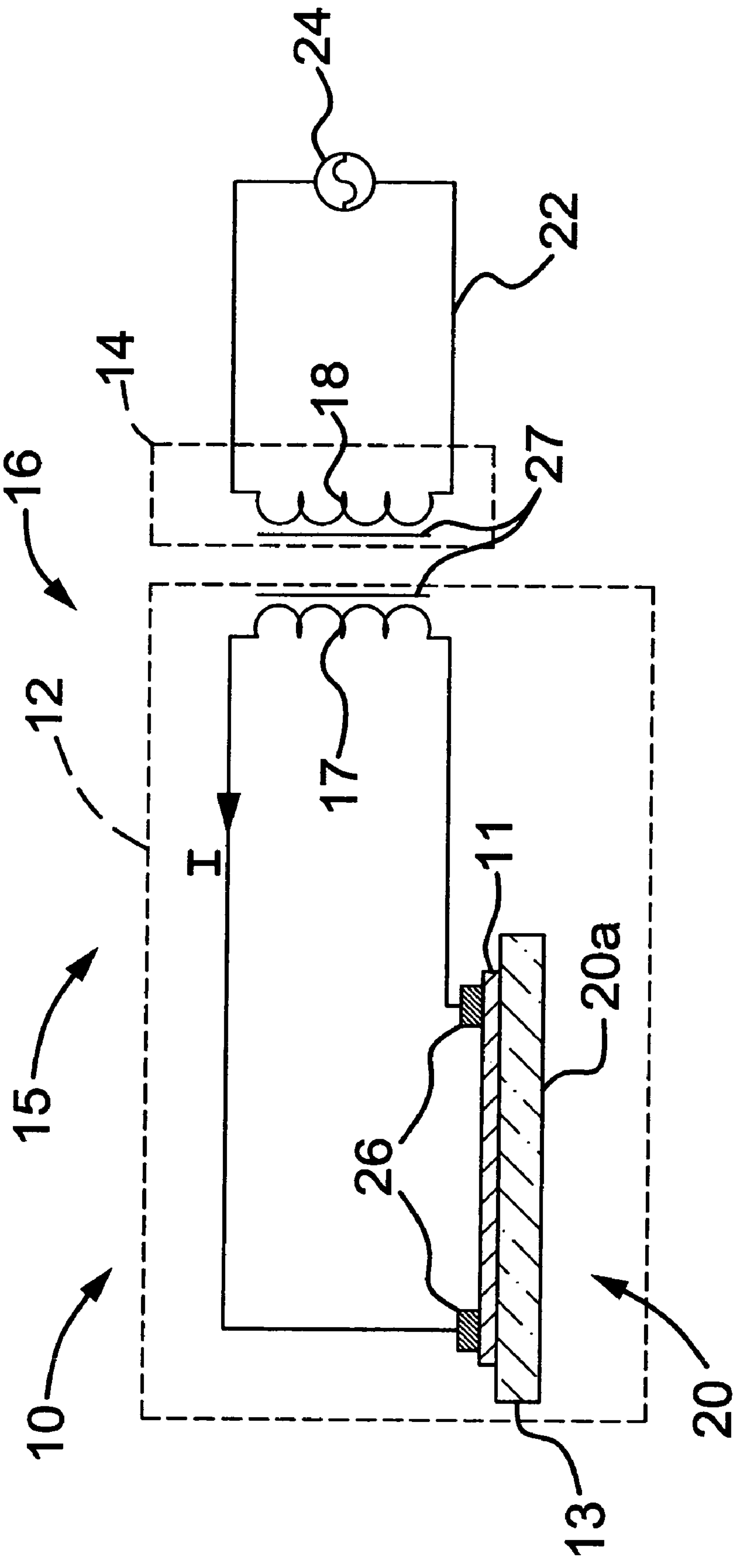
FIG. 2 is an electrical circuit schematic of the wireless inductive coupling assembly of FIG. 1.

Thus, when electrical power from the electrical power source 24 is communicated to the sending coil 18, an electrical current is induced in the receiving coil 17, which in turn causes electrical current I (as shown in FIG. 2) to be provided to the panel 20 for generating heat.

Hence, in the present invention, heating is not directly provided by an inductive flux from the coils 17,18. Instead, heating is provided by the panel 20, which utilizes electrical current I from the receiving coil 17.

In the present invention, the coating 11 may be a chemical vapor deposited metal oxide, like tin oxide, where the metal oxide is rendered electrically conductive by the inclusion of a dopant, such as fluorine, indium, and antimony. As such, the conductive thin-film coating 11 may be precisely and uniformly disposed on a suitable substrate 20*a* at a thickness of one micron or less.

The metal oxide may also possess low emissivity (low-E) thermal properties, such that much of the heat energy generated by the conductive coating is radiated into the dielectric sheet and then such heat energy is radiated away from the dielectric sheet, which may be transparent, opaque, or translucent.

Subsequently, objects and/or people are beneficially heated by way of heat radiation of such heat energy from the heated dielectric material or by way of convection of heated air. These processes result in little heat being wasted (see U.S. Pat. Nos. 7,039,304 and 7,041,942 to Gerhardinger et al., which are incorporated herein by reference in their entirety).

Although FIG. 1 illustrates the present invention as generally rectangular in shape, the present invention is not limited by the shape of the various structures, for example, items 12,14,20. It is, however, within the spirit and scope of the present invention that the shape of the various structures 12,14,20 might, for example, be square, elliptical, circular, or irregular. The dielectric substrate may comprise glass, glass-ceramic, or ceramic. The dielectric panels may be made of Thermique™ heated glass panels, which are a product of Engineered Glass Products, LLC of Chicago, Ill. The heated dielectric panel assembly 15 with receiving coil 17 and panel frame 12 may be separable from the opening frame 14.

Also, the above described dielectric panel 20 may be embodied, for example, as an architectural panel, a commercial panel assembly (for example, a commercial refrigerator or freezer door), an automotive panel assembly, or an appliance panel assembly, to name just a few. Therefore, depending on the embodiment of the present invention, the reference item 25 might be a building member when the heated dielectric panel assembly 15 is an architectural panel with a sash (panel frame) and a jamb (opening frame), might be a food freezer when the heated dielectric panel assembly 15 is a commercial panel, might be a vehicle body member when the heated dielectric panel assembly 15 is an automotive panel (e.g., a rear window or a mirror), or might be a cooktop when the heated dielectric panel assembly 15 is an appliance panel (as in U.S. Pat. Nos. '304 and '942).

Another example of an appliance panel assembly is a food item holding bin in a restaurant, where dielectric panels 20 could be utilized as heated glass doors to keep, for example, hamburger buns warm prior to utilizing the buns in hamburger sandwiches. Also, the various embodiments of the present invention may be in the form of laminated structures and/or insulating glass structures.

It has been found, while operating the electrical power source 24 at typical power line AC frequencies (i.e., 50/60 Hz) to heat the dielectric panel 20, that an efficiency power coupling of only 50% or less is obtained. In addition, when large ferromagnetic cores are utilized, the coils 17,18 undesirably vibrate and magnetically couple together when the coils 17,18 are energized.

However, while operating the electrical power source 24 at an AC frequency in the range of 20-40 kilohertz (i.e., nominally at 30 KHz) to power the dielectric panel 20, it has been found in the instant invention that an efficiency power coupling of 92% or higher is obtained. This is achieved by the wireless inductive coupling assembly 10, when the coils 17,18 are separated by the combined outside thicknesses of the panel frame 12 and the opening frame 14.

Although the present invention is not limited to any particular output, the following example is given as an insight to providing a 500 watt wireless inductive coupling assembly. A glass panel 20 with a coating 11 that is rated at a maximum of 25 watts per square foot, may be utilized in a typical heated slider door that measures seven feet by three feet (i.e., 21 square feet). Therefore, 25 watts per square foot times 21 square feet would provide approximately 500 watts for heating the sliding door. Of course, higher power applications would simply use a larger power supply and would cost more.

In contrast to the efficiency power coupling of 92% or higher that is obtained in the present invention, Sasaki, who was mentioned earlier, utilizes three coils (i.e., a first work coil, an induction coil, and a second work coil) to directly inductively heat a metal pan by way of inductive flux "eddy current losses."

Also, due to the inducement of current flow (i.e., between the coils 17,18) in the present invention, electrical shock hazard is virtually eliminated and the wiring to the heated dielectric panel assembly 15 is simplified, thus electrically isolating the electrical power source 24 from the dielectric panel 20. Since there are no wires and electrical contacts between the panel frame 12 and the opening frame 14, electrical reliability of the heated dielectric panel assembly 15 is greatly improved over existing heated glass assemblies and NEC and UL standards are met or exceeded.

Using the above-stated structure of the present invention, it is preferable that a non-iron core 27 (i.e., non-magnetic) be utilized to couple the coils 17,18, where the core 27 may comprise, for example, a ferrite (which also minimizes the size of the coils 17,18) or where an air core 27 may be utilized. Further, one or more of the coils 17,18 may be wound with Litz wire (which is known to be comprised of very fine multi-strand copper that basically eliminates magnetic coupling), and the panel frame 12 and the opening frame 14 are not comprised of iron/steel (i.e., not comprised of magnetic material).

Hence, as illustrated in FIG. 2, the outside thicknesses of the panel frame 12 and the opening frame 14 are part of the non-magnetic core 27. Further, the coils 17,18 could be essentially identical in structure and composition, and the coil geometry is, generally, that of a flat loop which is embedded in, possibly, a polymer or epoxy (not shown) to maintain the form of the loops.

The electrical power source 24, when embodied as a microprocessor utilizing software, may incorporate features to detect proper current draw by the dielectric panel 20 and, therefore, "know" when the coils 17,18 are aligned. For example, if a window/door 15 is opened/closed, then the electrical power source 24 would not attempt to power up the sending coil 18 unless the receiving coil 17 is in the proximity of the sending coil 18. Furthermore, the electrical power source 24 may regulate the power output to respond to faults (such as sensing broken glass or bad connectors), act as a fail-safe feature so as to insure safe operation under varying conditions, and to regulate heated dielectric panel assembly temperatures similar to that described in U.S. Application Publication '452 and as illustrated in FIG. 1A of the '452 Publication.

FIG. 2 depicts an electrical circuit of the present invention where at least two bus bars 26 are disposed thereon, and are in electrical connectivity with, the metal oxide coating 11. The metal oxide coating 11 is connected across the receiving coil 17, which is shown disposed within the panel frame 12. The sending coil 18 is shown in wireless inductive electrical communication with the receiving coil 17, where the sending coil 18 is disposed within the opening frame 14, thus illustrating the electrical isolation of the present invention. The sending coil 18 is also shown in electrical communication with the electrical power source 24.

As discussed above, the arrangement of the coils 17,18 of the present invention may not be applicable in ferrous (e.g., steel) frames 12,14. However, frames 12,14 of aluminum, wood, polyvinylchloride (PVC), and the like would be applicable.

Thus, the present invention provides an indirect electrical connectivity means to communicate electrical energy to a heated glass panel assembly 15 that is reliable, electrically safe, and energy efficient.

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. A wireless inductive coupling assembly for a heated dielectric panel assembly, comprising:

a dielectric panel having a metal oxide coating disposed thereon and having a panel frame disposed on at least a portion of a periphery thereof, wherein the dielectric panel is transparent;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source;

wherein electrical power from the electrical power source, by way of the sending coil and the receiving coil, is utilized by the dielectric panel to heat the dielectric panel.

2. The wireless inductive coupling assembly of claim 1, further comprising a second dielectric panel, wherein the dielectric panels are laminated to one another.

3. A wireless inductive coupling assembly for a heated dielectric panel assembly, comprising:

a dielectric panel having a metal oxide coating disposed thereon and having a panel frame disposed on at least a portion of a periphery thereof;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source;

wherein electrical power from the electrical power source, by way of the sending coil and the receiving coil, is utilized by the dielectric panel to heat the dielectric panel; and wherein the electrical power source operates in a frequency range of 20 to 40 kilohertz.

4. The wireless inductive coupling assembly of claim 1, wherein the dielectric panel comprises glass, ceramic, or glass-ceramic.

5. A wireless inductive coupling assembly for a heated dielectric panel assembly, comprising:

a dielectric panel having a metal oxide coating disposed thereon and having a panel frame disposed on at least a portion of a periphery thereof;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source;

wherein electrical power from the electrical power source, by way of the sending coil and the receiving coil, is utilized by the dielectric panel to heat the dielectric panel; and wherein the metal oxide coating is an electrically conductive doped metal oxide thin film coating disposed on a surface of the dielectric panel.

6. The wireless inductive coupling assembly of claim 5, wherein the thin film coating is one micron or less in thickness.

7. The wireless inductive coupling assembly of claim 5, wherein the thin film coating comprises a thermal low emissivity coating.

8. The wireless inductive coupling assembly of claim 5, wherein the thin film coating is non-magnetic.

9. The wireless inductive coupling assembly of claim 1, wherein the dielectric panel, with panel frame, are separable from the opening frame.

10. A wireless inductive coupling assembly for a heated dielectric panel assembly, comprising:

a dielectric panel having a metal oxide coating disposed thereon and having a panel frame disposed on at least a portion of a periphery thereof;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source;

wherein electrical power from the electrical power source, by way of the sending coil and the receiving coil, is utilized by the dielectric panel to heat the dielectric panel; and wherein the electrical power source comprises a microprocessor.

11. A wireless inductive coupling assembly for a heated dielectric panel assembly, comprising:

a dielectric panel having a metal oxide coating disposed thereon and having a panel frame disposed on at least a portion of a periphery thereof;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source;

wherein electrical power from the electrical power source, by way of the sending coil and the receiving coil, is utilized by the dielectric panel to heat the dielectric panel; and wherein a wireless inductive coupling assembly conforms to wiring codes regarding wires having voltages that exceed 42 volts as set by the National Electrical Code.

12. A wireless inductive coupling assembly for a heated dielectric panel assembly, comprising:

a dielectric panel having a metal oxide coating disposed thereon and having a panel frame disposed on at least a portion of a periphery thereof;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source;

wherein electrical power from the electrical power source, by way of the sending coil and the receiving coil, is utilized by the dielectric panel to heat the dielectric panel; and wherein a wireless inductive coupling assembly meets Underwriters Laboratory wiring codes on exposed wiring connectors at 110-250 volts.

13. An architectural panel assembly comprising a wireless inductive coupling assembly for a heated dielectric panel assembly, wherein the wireless inductive coupling assembly comprises:

a dielectric panel having a metal oxide coating disposed thereon and having a panel frame disposed on at least a portion of a periphery thereof;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source;

wherein electrical power from the electrical power source, by way of the sending coil and the receiving coil, is utilized by the dielectric panel to heat the dielectric panel; and wherein the panel frame is a sash and the opening frame is a jamb.

14. A commercial panel assembly comprising the wireless inductive coupling assembly of claim 1.

15. An automotive panel assembly comprising a wireless inductive coupling assembly for a heated dielectric panel assembly, wherein the wireless inductive coupling assembly comprises:

a dielectric panel having a metal oxide coating disposed thereon and having a panel frame disposed on at least a portion of a periphery thereof;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source; and wherein electrical power from the electrical power source, by way of the sending coil and the receiving coil, is utilized by the dielectric panel to heat the dielectric panel.

16. An appliance panel assembly comprising a wireless inductive coupling assembly for a heated dielectric panel assembly, wherein the wireless inductive coupling assembly comprises:

a dielectric panel having a metal oxide coating disposed thereon and having a panel frame disposed on at least a portion of a periphery thereof;

an opening frame cooperating with the panel frame to allow the dielectric panel to cover a panel opening;

a receiving coil being disposed in the panel frame and being in electrical communication with the metal oxide coating; and a sending coil being disposed in the opening frame, being in wireless inductive electrical communication with the receiving coil, and being in electrical communication with an electrical power source; and wherein electrical power from the electrical power source, by way of the sending coil and the receiving coil, is utilized by the dielectric panel to heat the dielectric panel.

17. An insulating glass panel assembly, comprising:

a first glass sheet and a second glass sheet, the first glass sheet having a major surface with a conductive thin film coating disposed thereon, at least two bus bars disposed on the conductive thin film coating, and the glass sheets having a panel frame disposed on at least a portion of a periphery thereof;

a spacer disposed between the two glass sheets on a periphery thereof, the spacer forming a gap between the two glass sheets, and the bus bars being adjacent the gap;

an opening frame cooperating with the panel frame to allow the glass sheets to cover a panel opening;

a receiving coil being disposed in the panel frame and the receiving coil being in electrical communication with the glass sheets; and a sending coil being disposed in the opening frame, being in wireless inductive electrical communication with the receiving coil, and being in electrical communication with an electrical power source;

wherein electrical power from the electrical power source, by way of the sending coil and the receiving coil, is utilized by the glass sheets to heat the glass sheets, and wherein the electrical power source operates in a frequency range of 20 to 40 kilohertz.

18. A method of making a wireless inductive coupling assembly, comprising:

disposing a receiving coil in a panel frame of a dielectric panel; and disposing a sending coil in an opening frame, the opening frame cooperating with the panel frame to allow the dielectric panel to cover a panel opening;

wherein the receiving coil and the sending coil are capable of wireless inductive electrical communication;

providing electrical power to the sending coil by way of an electrical power source, wherein the electrical power source operates in a frequency range of 20 to 40 kilohertz.

19. The method of claim 18, wherein the dielectric panel comprises glass, ceramic, or glass-ceramic.

20. The method of claim 18, wherein the dielectric panel is transparent.

21. A method of making a wireless inductive coupling assembly, comprising:

disposing a receiving coil in a panel frame of a dielectric panel, wherein the dielectric panel has an electrically conductive doped metal oxide thin film coating disposed on a surface of the panel; and disposing a sending coil in an opening frame, the opening frame cooperating with the panel frame to allow the dielectric panel to cover a panel opening;

wherein the receiving coil and the sending coil are capable of wireless inductive electrical communication.

22. The method of claim 21, wherein the thin film coating is one micron or less in thickness.

23. The method of claim 21, wherein the thin film coating comprises a low emissivity coating.

24. The method of claim 21, wherein the thin film coating is non-magnetic.

* * * * *